(12) United States Patent
Monti (10) Patent No.: US 7,905,340 B2
(45) Date of Patent: Mar. 15, 2011

(54) DEVICE FOR ORDERED ARRANGEMENT OF ARTICLES

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 84 days.

(21) Appl. No.: 12/495,101

(22) Filed: Jun. 30, 2009

(65) Prior Publication Data

US 2010/0012459 A1 Jan. 21, 2010

(30) Foreign Application Priority Data

Jul. 17, 2008 (IT) .............................. BO2008A0452

(51) Int. Cl.
*B65G 47/24* (2006.01)

(52) U.S. Cl. ......... 198/395; 198/392; 198/400; 198/409

(58) Field of Classification Search .................. 198/388, 198/392, 394, 395, 399, 401, 409
See application file for complete search history.

(56) References Cited

U.S. PATENT DOCUMENTS

| | | | | |
|---|---|---|---|---|
| 2,829,760 A | * | 4/1958 | Herrmann | 198/388 |
| 3,035,681 A | * | 5/1962 | Bennett | 198/399 |
| 3,447,662 A | * | 6/1969 | House | 198/395 |
| 3,572,494 A | * | 3/1971 | Aidlin et al. | 198/388 |
| 3,791,553 A | * | 2/1974 | Aidlin et al. | 198/392 |
| 4,480,740 A | * | 11/1984 | Wurmli | 198/400 |

FOREIGN PATENT DOCUMENTS

| | | |
|---|---|---|
| FR | 2062683 A | 6/1971 |
| JP | 60016337 A | 1/1985 |
| WO | WO8807016 A | 9/1988 |
| WO | WO2006/098679 A | 9/2006 |

OTHER PUBLICATIONS

European Search Report.

* cited by examiner

*Primary Examiner* — James R Bidwell
(74) *Attorney, Agent, or Firm* — William J. Sapone; Coleman Sudol Sapone P.C.

(57) ABSTRACT

The device comprises: a chute, on which tubes arranged in a line and with a random orientation of closed and open heads thereof, fall by gravity towards a rotor activated by a motor with stepped 90° displacements. A head tube enters one of two housings realised in the rotor, one housing being perpendicular to the other housing and destined in turn to be aligned with the line of tubes. An endrun stop halts the head tube while the sensor organs ascertain whether a frontally-situated head of the head tube is open or closed. The motor activates the rotor in a direction or in another, according to a datum supplied by the sensor organs, such that the open head of the tube is always in a predetermined position. During rotation cam means act in cooperation with containing and guide means to raise the head tube into a predetermined collection position where it is picked up by handling organs. The raising enables a following tube to insert in the other housing, which has in the meantime become aligned with the chute.

11 Claims, 7 Drawing Sheets

DEVICE FOR ORDERED ARRANGEMENT OF ARTICLES

BACKGROUND OF THE INVENTION

The invention relates to the technical sector of automatic machines for packing articles in tubular containers.

The tubular containers, or tubes, are to be directed one by one and in a predetermined orientation in a conveyor line which can be straight or a carousel, destined to transfer the tubes to a filling station in which special dispenser organs fill them with the articles.

Downstream of the filling station, further stations are provided for control, closure of the tubes and for any rejecting of unsatisfactory articles.

The technical problem posed, which relates to the present invention, consists in correctly orientating the tubes as they are entering the conveyor line, such that the open heads thereof are correctly facing the side of the dispensing organs, and therefore usually facing upwards.

The tubes which are normally used, apart from their size, are of two types: one which exhibits a broadened edge at the open head thereof, a sort of neck, or collar, and one which is without this broadening.

The first operation consists in arranged the tubes with a same orientation, for example in lines according to the longitudinal axes thereof or placed side-by-side, starting from a store in which the tubes are loosely accumulated.

Thereafter for each tube it is necessary to find where the open head is located, and on the basis of this the handling organs therefor can be piloted to pick it up and place it in the conveyor line.

For this second operation, known realisations use television camera systems which can detect the position of the open head, and handlers constituted by robots operating on at least three axes.

It is clear that these devices are not only expensive but require, in order to function in synchrony, a complex management program which is however liable to error since it is entirely based on visual data received from the cameras, and therefore on the chromatic contrast between contiguous zones of the image produced, which can sometimes be insufficient for obtaining data which truly relate to actuality.

Only for tubes having a collar can a known device be used, which is able to orientate all the tubes with the openings thereof facing upwards.

The device comprises a horizontal conveyor line, constituted by two belts arranged side-by-side, onto which the tubes are supplied in a line according to their longitudinal axes and having a random arrangement of the relative open and closed heads.

In an initial tract of the conveyor line, the belts are side-by-side with a free space which is smaller than the minimum diameter of the tube, so that the tube is supported at both the open head and the closed head; downstream of the initial tract the belts are slightly distanced from one another such that the free space between them is greater than the minimum diameter of the tube but smaller than the maximum diameter thereof, i.e. the collar area.

When the closed head of the tube, i.e. the head with the smaller diameter, reaches the point where the belts are reciprocally furthest away from each other, the tube is no longer retained and the fall thereof causes a spontaneous rotation of the tube which is then vertical with the opening thereof facing upwards, retained by the belts at the collar zone thereof.

The spontaneous rotation described above occurs independently of the fact that the closed head is arranged upstream or downstream according to the advancement direction of the tube itself.

In order to function, the known device described above requires tubes having a quite-pronounced collar zone, such that the difference between the minimum and maximum diameters thereof is sufficient for the belts to retain the collar while the gap is also sufficient to enable the spontaneous rotation of the tube.

SUMMARY OF THE INVENTION

The aim of the present invention is therefore to provide a device for ordered arrangement of articles, in particular tubes having an open head and a closed head, which is structured such as to function optimally, independently both with tubes having collars and those without.

A further aim of the invention consists in providing a device in which the functioning logic is not based on visual information acquired by television cameras.

A further aim of the invention relates to the desire to provide a device which is of simple conception, lacking in complex and expensive components and therefore relatively inexpensive while at the same time offering excellent reliability.

A further aim of the invention is to provide a compact device which is provided with high operative velocity and which is able to function in combination with handling organs of the pick and place type rather than the more costly types of robot having three necessary working axes in some known solutions.

BRIEF DESCRIPTION OF THE DRAWINGS

The characteristics of the invention will emerge from the following description, which relates to a preferred embodiment of the device in accordance with what is set out in the accompanying claims, and with the aid of the accompanying figures of the drawings, in which:

DESCRIPTION OF THE PREFERRED EMBODIMENTS

With reference to the figures of the drawings, 1 denotes the device of the invention in its entirety.

The device 1 is destined to receive elongate articles 2, for example tubes, in which a relative head 2A is open while the remaining head 2B is closed, and to orientate them one by one in a predetermined pick-up position P in which the relative open head 2A is facing in a same direction.

The device 1 is particularly suitable for being associated to a known automatic machine (not illustrated) mentioned in the preamble hereto, at an inlet station thereof.

Handling organs 100 of known type (of which more herein below) cooperate with the device 1, picking up the tubes 2 arranged in the collection position P and putting them one by one and with a predetermined orientation into a straight or carousel conveyor of the machine.

Figures 1, 2:
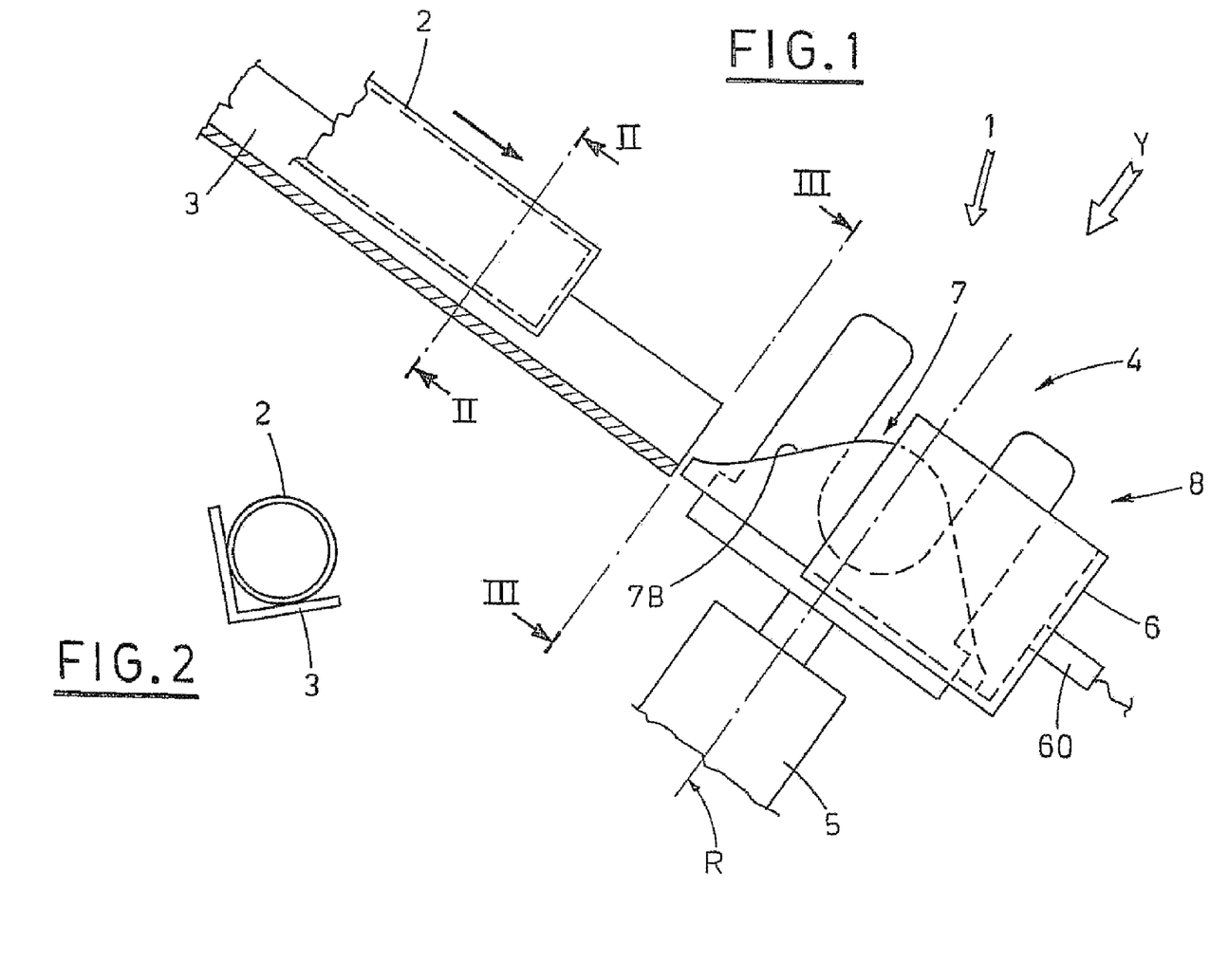
FIG. 1 is a schematic lateral view of the device, with a first tube arriving.
FIG. 2 is a view of section II-II of FIG. 1.

The device 1 comprises means 3 for supplying the tubes 2 arranged in a row according to the longitudinal axis thereof, with a random orientation of the closed heads 2B and the open heads A, to a rotor 4 located downstream and having a rotation axis R arranged on a vertical plane, as well as being perpendicular to the row of tubes 2 (FIG. 1).

The supply means 3 are constituted, in the illustrated example, by a chute having a V-profile, and being of dimensions and shape according to the diameter of the tubes 2 (FIG. 2).

The inclination of the chute 3 is specially designed in order to obtain a spontaneous descent by force of gravity of the row of tubes 2, which known organs (not illustrated) located upstream of the chute 3 are provided to maintain continuous.

Figure 3:
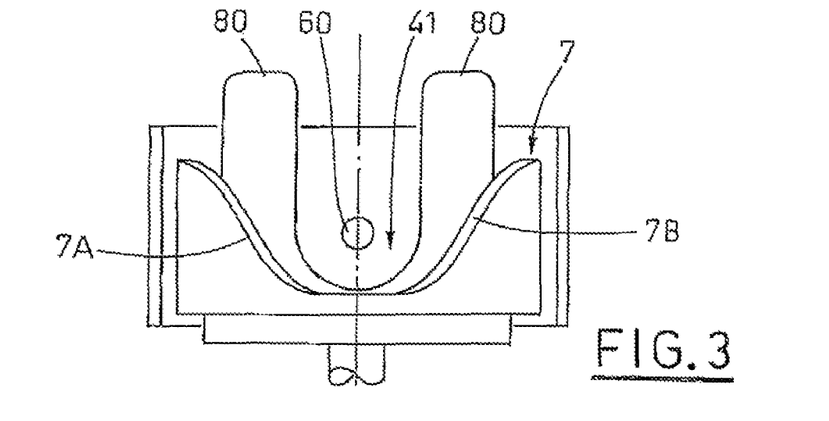
FIG. 3 is a view of organs of the device according to plane III-III of FIG. 1.
Figure 4:
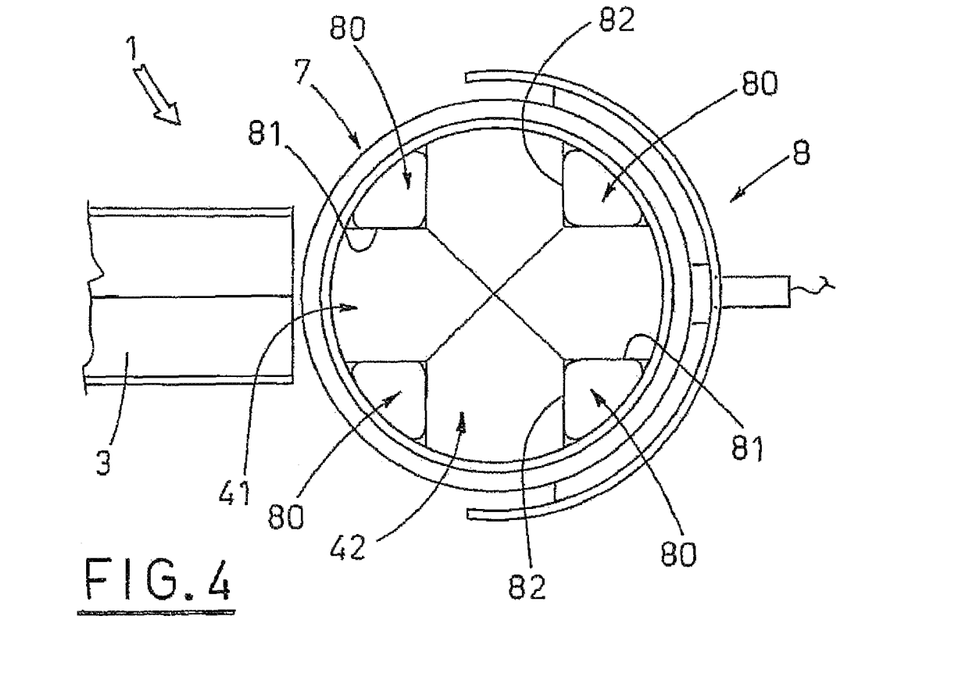
FIG. 4 is a plan view of the device according to arrow Y of FIG. 1.

Two shaped housings 41, 42 are realised in the rotor 4 on a same perpendicular plate to the rotation axis R, respectively a first and a second housing, which are arranged in a cross-fashion, one perpendicular to the other; the housings 41, 42 are semicircular and superiorly open (FIGS. 1, 3, 4).

The rotor 4 is activated by motor organs 5 which impress 90° steps on the rotation, in a direction or another, in ways which will be described herein below.

Figure 5:
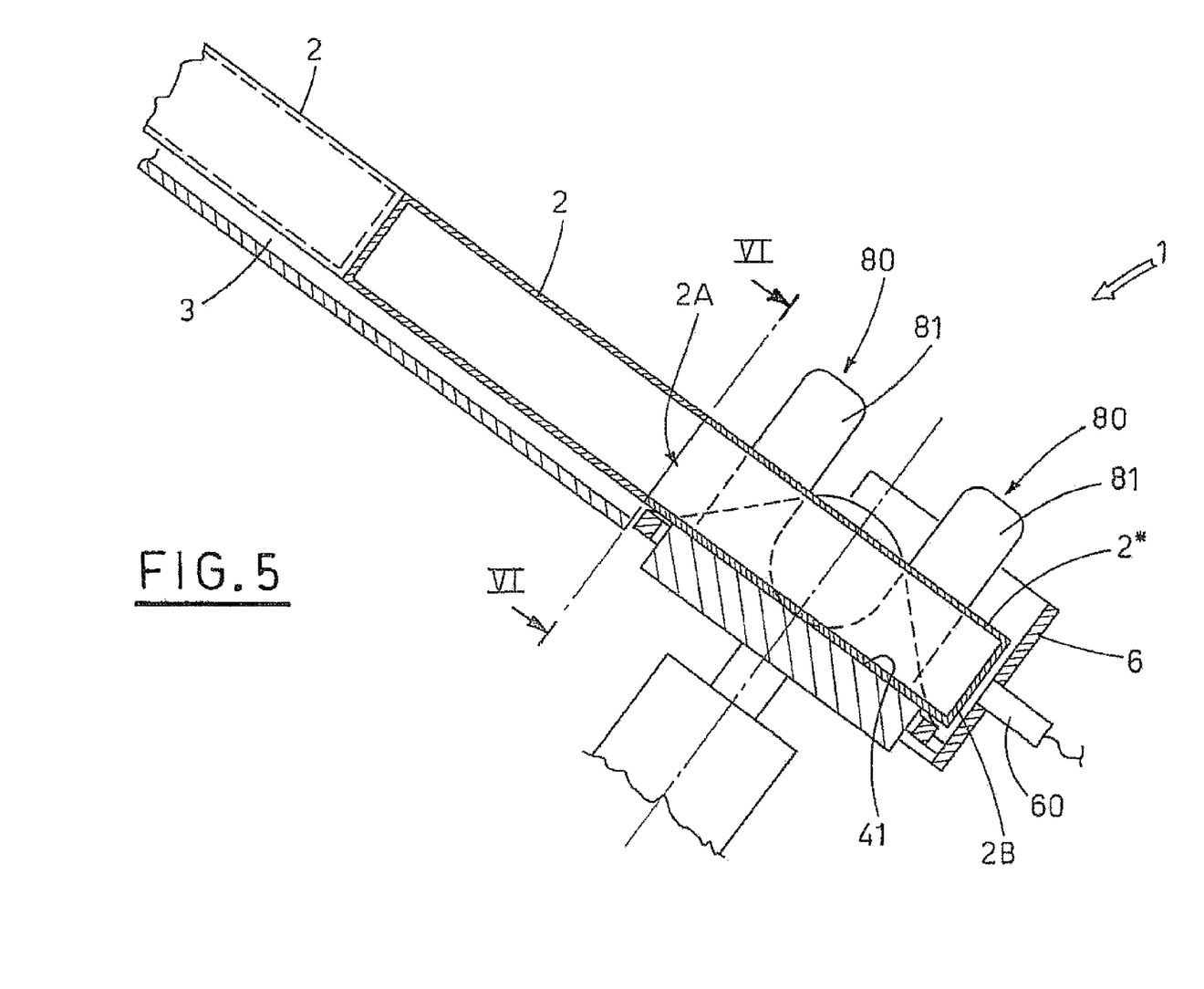
FIG. 5 is a similar view to that of FIG. 1, with parts of the device sectioned, in a first stage of full operation.
Figure 6:
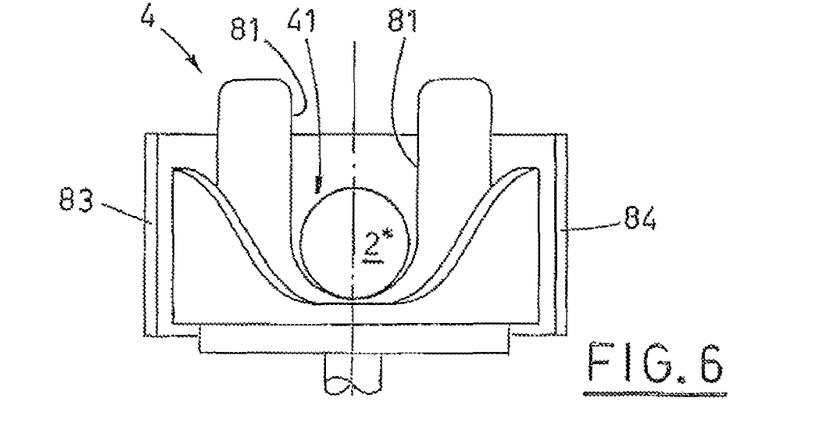
FIG. 6 is a view along plane VI-VI of FIG. 5 of the same operating organs of FIG. 3, in the first stage of full operation.
Figure 7:
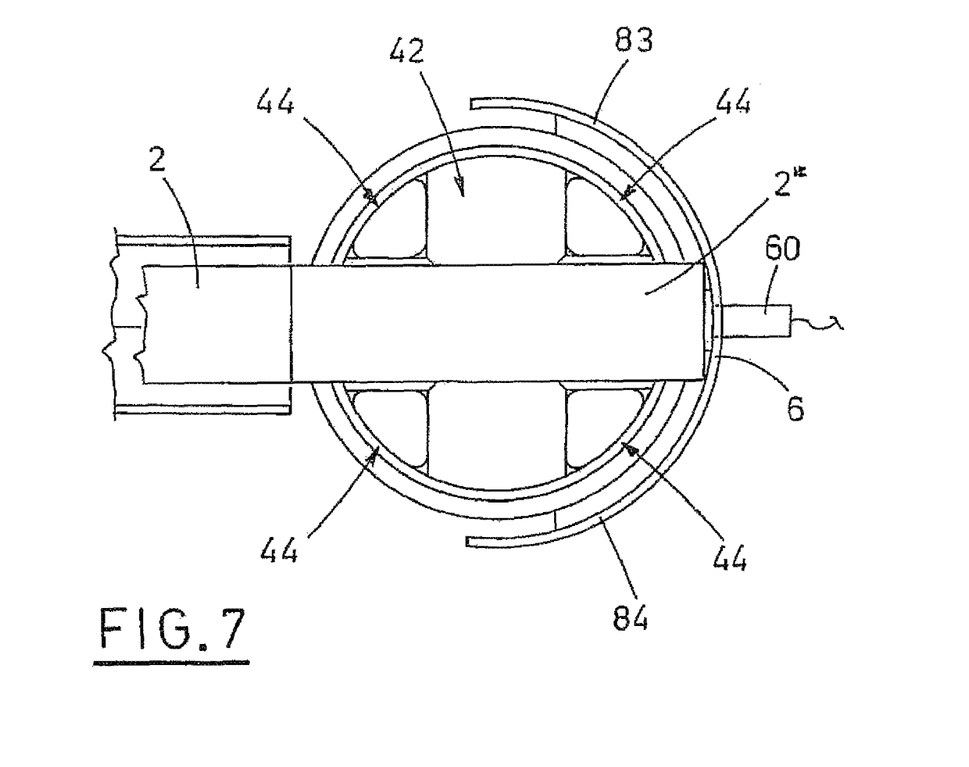
FIG. 7 is a plan view of FIG. 5.

The two housings 41, 42 are brought by the rotations into aligned positions in turn with the row of tubes 2 and are positioned at such a level as to enable the head tube 2\* to enter therein by force of gravity (FIGS. 5, 6, 7).

An endrun stop 6 is positioned externally of the rotor 4, diametrically opposite the chute 3, which stop 6 is destined to stop the advancing of the head tube 2\* in a predetermined position internally of the corresponding housing 41, 42 such that the head article 2\* exits symmetrically with the respective ends from the rotor 4 (FIGS. 5 and 7).

Sensor organs 60 are associated to the endrun stop 6, which sensor organs 60 recognise the type of the head, either open 2A or closed 2B, which is presented by the head tube 2\* resting against the endrun stop 6 (FIGS. 5 and 7).

In this way, obviously, the arrangement of each of the heads 2A, 2B can be determined and memorised by the control organs, which are for example of an electronic type and not illustrated, destined to command a 90° rotation of the rotor 4, selected in the appropriate direction, as will be better explained herein below.

Cam means 7 are comprised externally of the rotor 4, destined to raise the head tube 2\* from the bottom of the relative housing 41, 42 as a consequence of the selected rotation, by an amount which is slightly greater than the diameter of the head tube 2\*.

In the illustrated example, the cam means 7 are of a fixed type and are constituted by two symmetrical profiles 7A, 7B, arranged at the two sides of the housing 41, 42 which from time to time in the cycle is aligned with the chute 3, the profiles 7A, 7B being provided for intercepting, during the selected rotation, the ends of the head tube 2\* which project outwards from opposite sides of the housing 41, 42 (FIGS. 1, 3, 8A, 9A, 10, 11).

The device 1 also comprises containing and guide means 8 which intercept and retain the head object 2\* during the raising imposed thereon by the cam means 7 to prevent any transversal or longitudinal displacements thereof.

The containing and guide means 8 are in part realised in the body of the rotor 4 and in part are associated to the endrun stop 6.

The containing and guide means 8 comprise four stems 80, positioned at the four segments 44 identified in plan view between the two housings 41, 42, with the stems 80 being extended upwards, parallel to the axis R of the rotor 4, and each being conformed, along the development direction, to define two mutually perpendicular surfaces, respectively a first surface 81 and a second surface 82 (FIGS. 1, 3, 4, 7).

The first surface 81 of each stem 80 is tangential to the first housing 41, while the second surface 82 is tangential to the second housing 42 (FIG. 4).

Each stem 80 externally forms a curved surface 88 which is concentric to the external circumference of the rotor 4.

The part of the containing and guide means 8 relative to the endrun stop 6 comprises two semicircular walls, a first wall 83 and a second wall 84, which are concentric to the rotor 4 and extend symmetrically at two sides of the endrun stop 6, externally of the cam means 7, over respective arcs of greater than 90° (FIGS. 1, 3, 4).

The functioning of the device 1 will now be described, starting from the situation illustrated in FIG. 1, in which the tubes 2 start the descent thereof in the chute 3.

The rotor 4 is stationary, with the first housing 41 aligned with the chute 3 (FIGS. 3 and 4) such as to enable the head tube 2\* to enter therein by force of gravity, up until it meets the endrun stop 6 which halts it in the predetermined position (FIGS. 5, 6 7).

The other tubes 2 in the line and present on the chute 3 are stopped behind the head tube 2\* (see also FIG. 5).

The sensor organs 60 recognise whether the front head of the head tube 2\* is the open head 2A or the closed head 2B, as illustrated in FIG. 5.

Figure 8A:
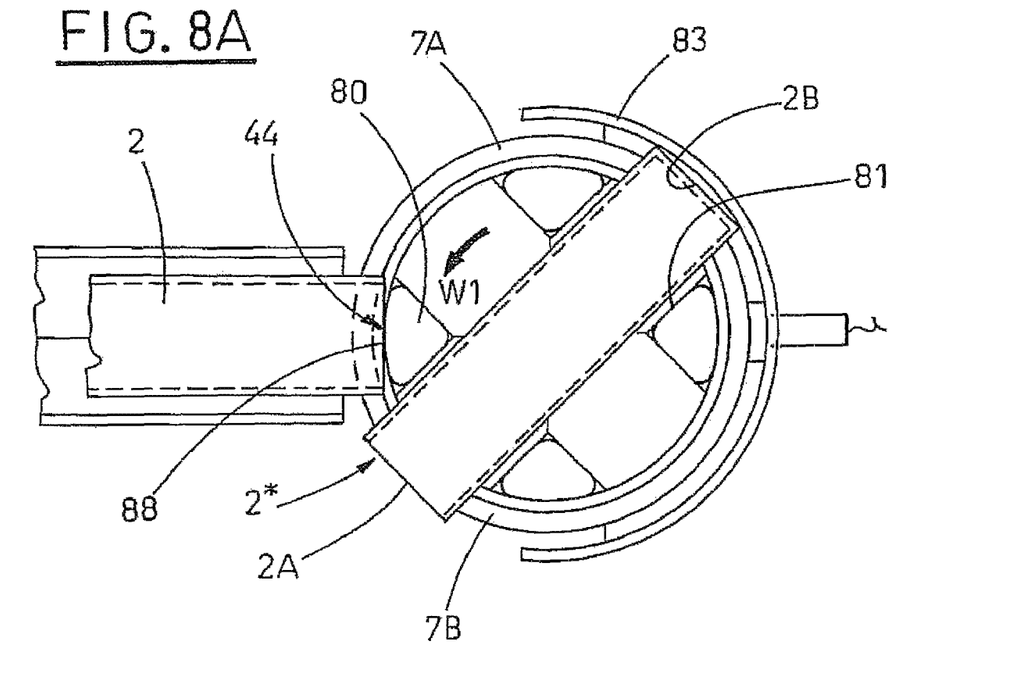
FIGS. 8A, 8B are plan views of two successive moments of a second operational stage of the device on ascertainment of a first condition.

In consequence of this, the control organs activate the motor organs 5 to impress on the rotor 4 a rotation of 90° in a predetermined direction W1, for example anticlockwise (FIG. 8A).

The two ends of the head tube 2\*, following the rotation, encounter the corresponding cam profiles 7A, 7B which determine the progressive raising of the head tube 2\* from the bottom of the relative housing 41.

The head tube 2\* is held laterally by the first surfaces 81 of the four stems 80, while the first semicircular wall 83, encountering the closed head 2B, prevents the tube 2\* from making longitudinal movements (FIG. 8A).

In the intermediate stage of the rotation, the tube 2 which follows the head tube 2\*, once no longer resting there-against, rests on the outside of the corresponding stem 80, on the relative curved surface 88 thereof (see FIG. 8A once more).

Figure 8B:
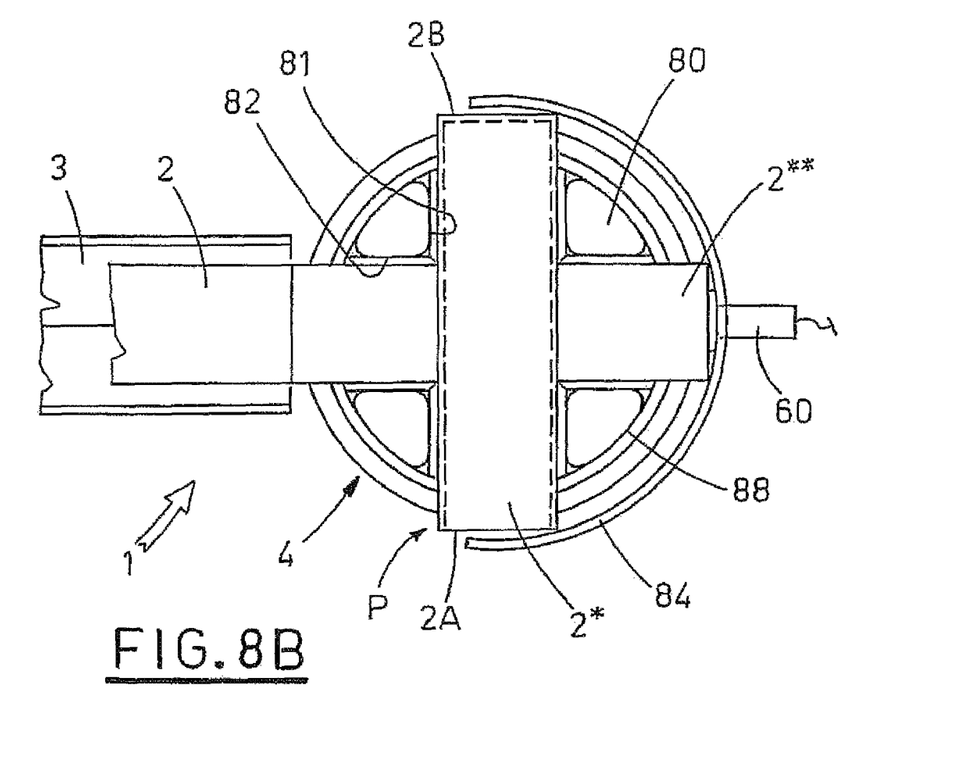

At the end of the rotation in direction W1, the head tube 2\* is raised in the collection position P, with the open head 2A facing the right side of the device 1, with reference to the advancement direction of the tubes 2 along the chute 3 (FIG. 8B).

Figure 9A:
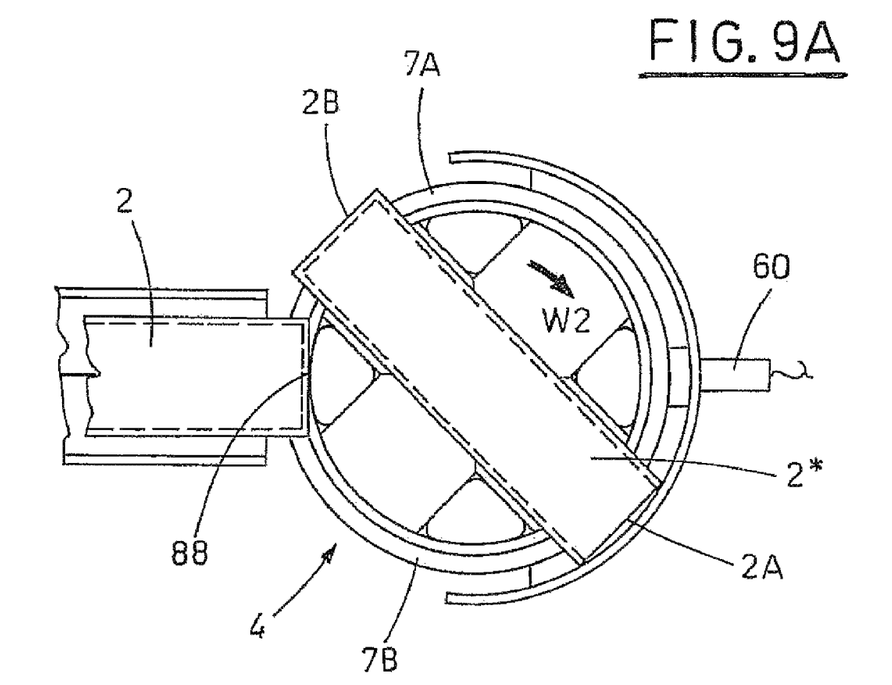
FIGS. 9A, 9B are similar views to those of FIGS. 8A, 8B showing relative successive moments in a second operational stage of the device, on ascertainment of a second condition opposite to the first condition.

In a case in the which the head tube 2\* has the heads thereof in an inverted position with respect to the above description, the rotor 4 is activated in direction W2, opposite the first direction and therefore clockwise (FIG. 9A).

Figure 9B:
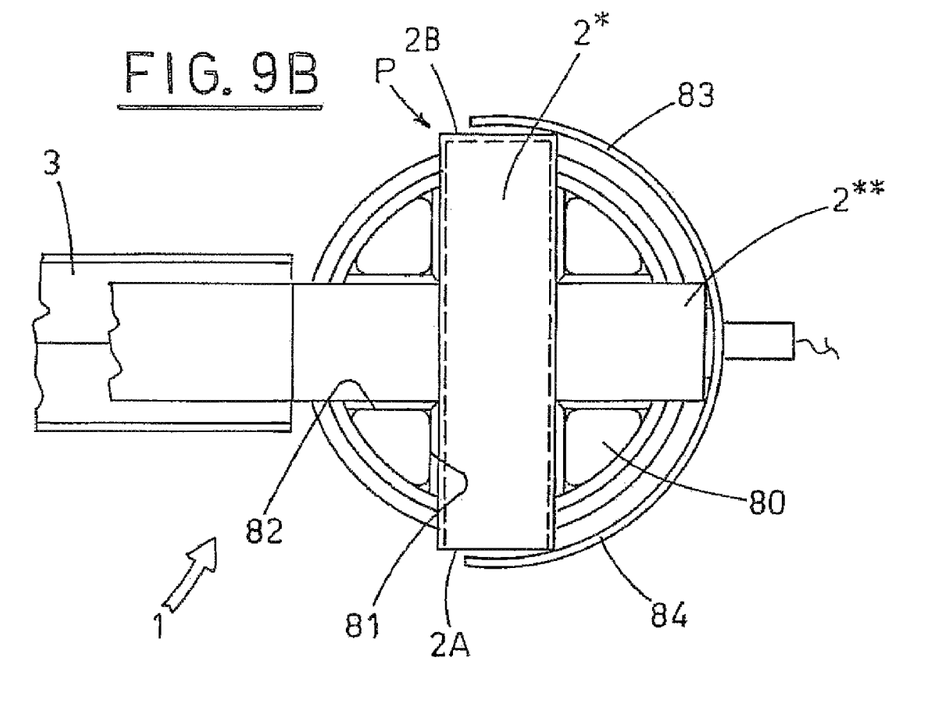

In a specular functioning of the cam means 7 and the containing and guide means 8, the head tube 2\* is at the end of the rotation in direction W2 in the collecting position P, with the open head 2A facing the right side of the device 1 (FIG. 9B).

Figure 10:
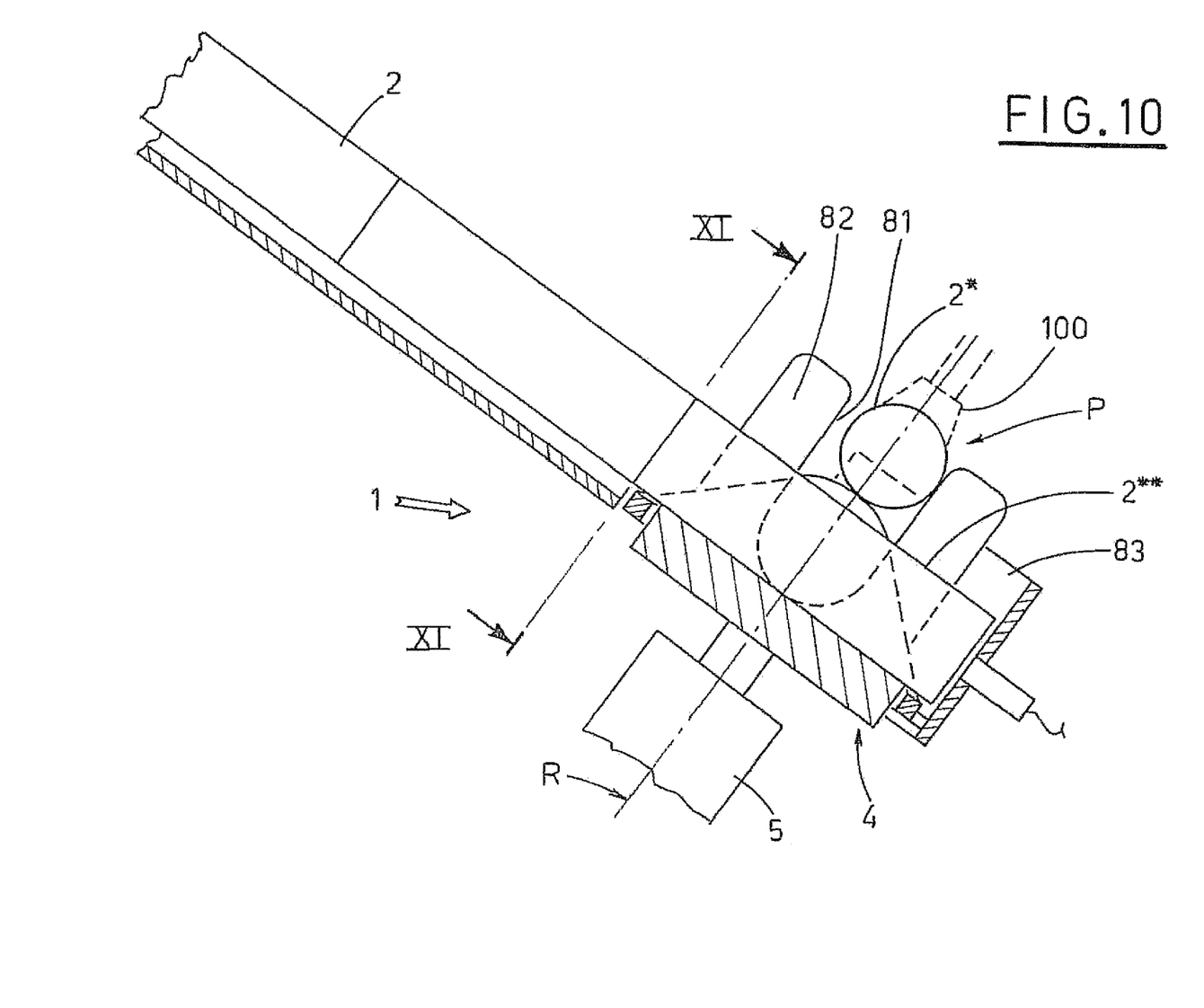
FIG. 10 is a similar view as in FIG. 1, with the device at the end of the second operational stage as in FIGS. 8B, 9B.
Figure 11:
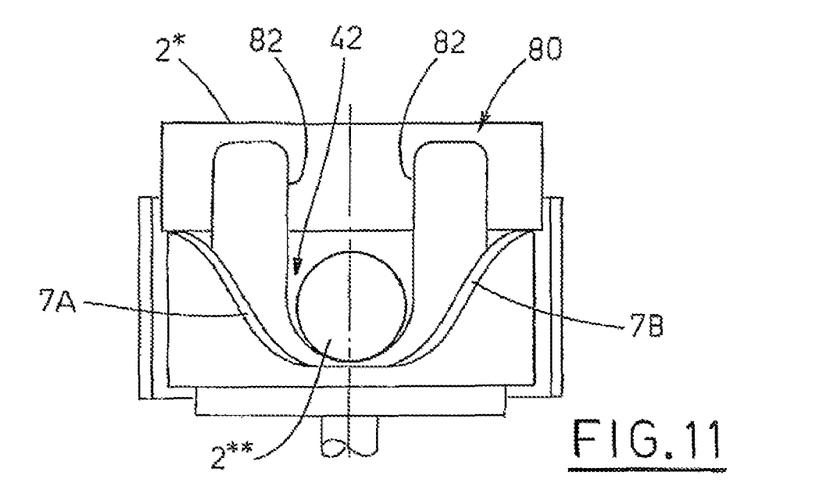
FIG. 11 illustrates a similar view to that of FIG. 10, with the same operating organs of FIG. 3 at the end of the second operational stage.

At the end of the 90° rotation, independently of the direction impressed thereon, the second housing 42 is aligned with the chute 3, enabling the second tube **2\*\*, which follows the head tube 2\*, to enter up until it meets the endrun stop 6 and being arranged perpendicular to and underlying the head tube 2\* (FIGS. 8B, 9B, 10**).

Before the rotor 4 is newly activated in one or another of the two rotation directions W1, W2, according to the arrangement of the heads of the second tube **2\*\*, the handling organs 100 intervene (denoted with dotted lines in FIG. 10), in order to remove the head tube 2\*** from the collection position P.

Obviously, in normal working conditions, the above-described stages are performed in order, with the only variable being the activation direction of the rotor 4, the variable being determined according to the orientation of the tube 2 involved.

The handling organs 100, thanks to the special characteristics of the device, can advantageously be of a type having one or two operational axes, known as the pick and place type.

The tubes 2 illustrated in the enclosed figures are of the type not having a collar but the device 1 can also function in the same way as described herein with tubes provided with a collar.

From the above it is clear how the described device is able fully to reach all the aims denoted in the preamble, firstly with regard to the simplicity of the technical solution with which the open and closed heads of the tubes are recognised and orientated, independently of the presence or not of the collar.

This constructional simplicity, evidenced by the absence of television cameras and/or complex components, gives rise to a high level of reliability of the device, together with contained production costs.

The conformation of the device enables overall size to be limited and at the same time to exhibit high operational velocity, certainly able to meet the productivity requirements of a modern machine.

The above is, however, intended to be by way of a non-limiting example, so that any eventual modifications to details thereof which may become necessary due to technical and/or functional contingencies, or in order to suit the device to special article shapes, are considered to fall within the ambit of protection as defined in the following claims.

What is claimed:

1. A device for ordered arrangement of elongate articles, in which a respective head is open and another head is closed, which comprises: means for supplying the articles, arranged in a line according to a longitudinal axis thereof, with a random orientation of the closed heads and the open heads, to a rotor arranged downstream, having a relative rotation axis arranged on a plane which is vertical as well as perpendicular to the line of articles; two shaped housings realised on a same plane which is perpendicular to the axis of the rotor, the housings being perpendicular to one another, superiorly open and destined to be in turn aligned with the line of articles in order to receive a head article of the line; an endrun stop, diametrically opposite the supply means, located externally of the rotor and destined to halt an advancing of the head article in a predetermined position internally of the corresponding housing; sensor organs associated to the endrun stop, destined to detect, for each head article resting on the endrun stop, an arrangement of the closed head and the open head; motor organs for impressing on the rotor rotations of 90° steps in a direction or in another direction, on a basis of information provided by the sensor organs to control organs, such that at an end of the selected rotation the open head of the head article is in a predetermined position; cam means for raising the head article from a bottom of the relative housing thereof, following the selected rotation, by an amount such as to bring the head article, at an end of the selected rotation, into a predetermined collection position and to enable a following article of the line of articles to insert in the other housing, being arranged perpendicular to and underlying the head article; containing and guide means for intercepting and retaining the head article during the raising of the head article by the cam means, consequently to the selected rotation, in order to prevent transversal or longitudinal displacements thereof.

2. The device of claim 1, wherein the supply means are constituted by a chute having a V-shaped profile, being of appropriate dimensions and shape and inclined at a predetermined angle, in order to obtain a spontaneous descent by force of gravity of the line of articles.

3. The device of claim 1, wherein the cam means are fixed and comprise two symmetrical profiles, arranged at two sides of the housings of which housings one becomes aligned time-by-time with the line of articles, which profiles meet, during the selected rotation, the ends of the head article which project from opposite ends of the housing.

4. The device of claim 1, wherein the containing and guide means comprise: four stems, positioned at four segments seen in plan view located between the housings, the stems extending upwards, parallel to the axis of the rotor, each of the stems being conformed along a development direction thereof to define two mutually perpendicular surfaces, a first surface and a second surface; two semicircular walls, a first wall and a second wall, which are concentric of the rotor and symmetrically extended at two sides of the endrun stop, externally of the cam means, for arcs of greater than 90°.

5. The device of claim 4, wherein the first surface of each stem is tangential of a first housing, while the second surface is tangential of the remaining housing.

6. The device of claim 4, wherein each of the stems of the containing and guide means externally exhibits a curved surface, concentric with the external surface of the rotor, destined in turn to be facing towards the supply means during a relative selected rotation of the rotor, as well as being destined to meet and halt an article in arrival from the supply means.

7. The device of claim 4, wherein each of the stems of the containing and guide means externally exhibits a curved surface, concentric with the external surface of the rotor, destined in turn to be facing towards the supply means during a relative selected rotation of the rotor, as well as being destined to meet and halt an article in arrival from the supply means.

8. The device of claim 1, wherein the housings exhibit a semicircular shape.

9. The device of claim 3, wherein the housings exhibit a semicircular shape.

10. The device of claim 4, wherein the housings exhibit a semicircular shape.

11. The device of claim 5, wherein the housings exhibit a semicircular shape.

* * * * *